US007603296B2

(12) United States Patent
Whiteley et al.

(10) Patent No.: US 7,603,296 B2
(45) Date of Patent: Oct. 13, 2009

(54) METHOD FOR MONITORING WELL EQUIPMENT DURING TRANSPORT AND STORAGE

(75) Inventors: Thomas G. Whiteley, Houston, TX (US); Ronald Duane Thomas, Kingwood, TX (US); Ben R. Sullivan, Houston, TX (US); Bruce Edward Davis, Houston, TX (US); James P. Wakefield, The Woodlands, TX (US)

(73) Assignee: PPI Technology Services, LP, Houston, TX (US)

( * ) Notice: Subject to any disclaimer, the term of this patent is extended or adjusted under 35 U.S.C. 154(b) by 1521 days.

(21) Appl. No.: 10/277,531

(22) Filed: Oct. 22, 2002

(65) Prior Publication Data
US 2004/0078306 A1  Apr. 22, 2004

(51) Int. Cl.
*G06F 17/60* (2006.01)
(52) U.S. Cl. .................... 705/28; 701/213; 700/115; 700/215; 700/229; 700/225; 340/10.34; 340/10.51; 340/505; 340/572.4
(58) Field of Classification Search .............. 705/28; 340/375, 383, 385, 10.34; 700/225, 226, 700/229; 235/384, 385, 492, 383; 364/222.6, 364/403, 401; 701/213
See application file for complete search history.

(56) References Cited

U.S. PATENT DOCUMENTS 4,570,416 A * 2/1986 Shoenfeld .................... 53/415
5,038,283 A * 8/1991 Caveney ....................... 705/28

(Continued)

OTHER PUBLICATIONS

Unknown Author, "ASI on Track With SecurEtag", Aug. 31, 2001, PR Newswire, Financial News.*

(Continued)

*Primary Examiner*—Matthew S Gart
*Assistant Examiner*—Olusegun Goyea
(74) *Attorney, Agent, or Firm*—Buskop Law Group, PC; Wendy Buskop

(57) ABSTRACT

Items of equipment and assemblies for use in drilling or completion of a well or in other well operations are monitored from the time they are assembled for shipment to a particular well site for a job through the time of delivery and installation at the well site. Radio frequency identifier devices (RFID's) are mounted with the items to electronically tag them as they are assembled for shipment. The items are assembled into containers which can be readily inventoried during transit to detect loss or pilferage. Detailed information about the individual items can be encoded into the RFID at the time of electronic tagging. If desired, the shipping containers can be provided with separate RFID's detailing the particular items within the container and the progress of the shipment monitored remotely by satellite or the like.

8 Claims, 3 Drawing Sheets

U.S. PATENT DOCUMENTS

| | | | | |
|---|---|---|---|---|
| 5,828,322 | A | * | 10/1998 | Eberhard ................... 340/988 |
| 5,971,587 | A | * | 10/1999 | Kato et al. ................. 700/115 |
| 6,081,827 | A | * | 6/2000 | Reber et al. ................ 709/200 |
| 6,208,910 | B1 | * | 3/2001 | Michael et al. ............ 700/225 |
| 6,275,153 | B1 | | 8/2001 | Brooks |
| 6,333,699 | B1 | | 12/2001 | Zierolf |
| 6,333,700 | B1 | | 12/2001 | Thomeer et al. |
| 6,346,884 | B1 | * | 2/2002 | Uozumi et al. .......... 340/572.1 |
| 6,600,418 | B2 | * | 7/2003 | Francis et al. ........... 340/572.1 |
| 6,897,827 | B2 | | 5/2005 | Senba et al. |
| 7,036,729 | B2 | * | 5/2006 | Chung ....................... 235/385 |
| 2001/0002464 | A1 | | 5/2001 | Hogan |
| 2001/0047283 | A1 | | 11/2001 | Melick et al. |
| 2002/0185532 | A1 | | 12/2002 | Berquist et al. |
| 2003/0149526 | A1 | * | 8/2003 | Zhou et al. ................. 701/213 |
| 2005/0248459 | A1 | * | 11/2005 | Bonalle et al. .......... 340/572.8 |

OTHER PUBLICATIONS

Unknown Author, "RFID chip will help speed up business", May 14, 2001, New Straits Times-Mamngement Times.*
Louis Frenzel, "An Evolving ITS Pave The Way For Intelligent Highways", Jan. 8, 2001, Electronic Design, vol. 49 Issue 1, pp. 102.*
Amy Zuckerman, "CargoMate, e-seal marriage should promote security.; Global Supply Chain; Department of Transportation and Department of Defense look for more safety measures", Nov. 1, 2002, World Trade, p. 20(1).*

* cited by examiner

METHOD FOR MONITORING WELL EQUIPMENT DURING TRANSPORT AND STORAGE

BACKGROUND OF THE INVENTION

1. Field of the Invention

The present invention relates to inspection and monitoring of equipment and assemblies used on or in connection with wells, particularly during storage and shipment of the equipment and assemblies, to verify the integrity of such items.

2. Description of the Related Art

Oil and gas well completion tools, drilling tools, and other completion and drilling accessories required for use on a particular well are typically placed in one or more shipping containers for transportation to a well site for use on a rig or a well operation. Those items of well equipment are assembled as a group according to the specific well operation for which they are intended at the particular well site. The shipping container or containers typically used may be a metal basket of varying dimensions. Such a metal basket or container is placed on a truck, marine vessel, or other transport vehicle to be transported to a well site. At the well site, the tools are then available for use. Rather than containers, some or all of these objects may from time to time be placed on a trailer, strapped or secured down, and then transported to a well location.

In addition, for certain wells or certain well operations, specific specialized items of equipment are required. This may include, but not be limited to, the certification of certain drilling and completion components and assemblies. This certification may include, for example, re-inspection of assembled components, testing of assembled components and verification of completion of components. Certification of the materials or composition of particular components is also an important factor. For example, if there are special pressure or gas composition conditions in a particular well, the well tools may need to be of a particular composition, or of a specified strength of steel.

It is an acknowledged fact that on occasions certain components or assemblies have been taken or lost from their containers while in storage or during a shipment to fulfill an order for another job. This could occur for a number of reasons. For example, such a loss might occur when several jobs are being loaded and equipment for one job must be shipped before the others. Problems occur when the component that was taken from one shipping container does not get replaced. The container with missing equipment can be sent to a well site and the absence of one more items only then becomes known. In such a case, operations on the well rig must be suspended to wait on a replacement component or assemblage.

Suspension of operations of an offshore drilling or completion rig or land drilling or completion rig to wait on components is expensive. The costs could range from ten thousand dollars per day on a land rig to over two hundred fifty thousand dollars per day for an offshore rig.

SUMMARY OF THE INVENTION

Briefly, the present invention provides a new and improved method of monitoring shipments of well equipment components during transport and storage for a well operation for use. Information about the components of the shipment is encoded into radio frequency identifiers. The encoded radio frequency identifiers with information about components are then attached to the respective components. The components for the well job are then assembled into one or more shipment modules for transport and storage. During transport and storage, the radio frequency identifiers are then monitored to insure that the equipment components are not diverted or otherwise misplaced during transport and storage.

As an additional feature, radio frequency identifiers can be encoded with information about the modules, and their contents can be attached to the modules and monitored during their transport and storage. Further, the results of monitoring the radio frequency identifiers can be transmitted to a central or control location.

The present invention also provides a new and improved identifier mechanism for an item of well equipment which has at least one threaded connector. The identifier mechanism contains information about the equipment for monitoring during transport of the item to a rig or well operation. The identifier mechanism includes a radio frequency identifier indicating information when activated. The radio frequency identifier has a storage memory containing information about the item of well equipment. A thread protection assembly of the identifier mechanism is adapted to be mounted on the threaded connector of the item of equipment and has the radio frequency identifier contained in it.

DETAILED DESCRIPTION OF THE PREFERRED EMBODIMENTS

Figure 1:
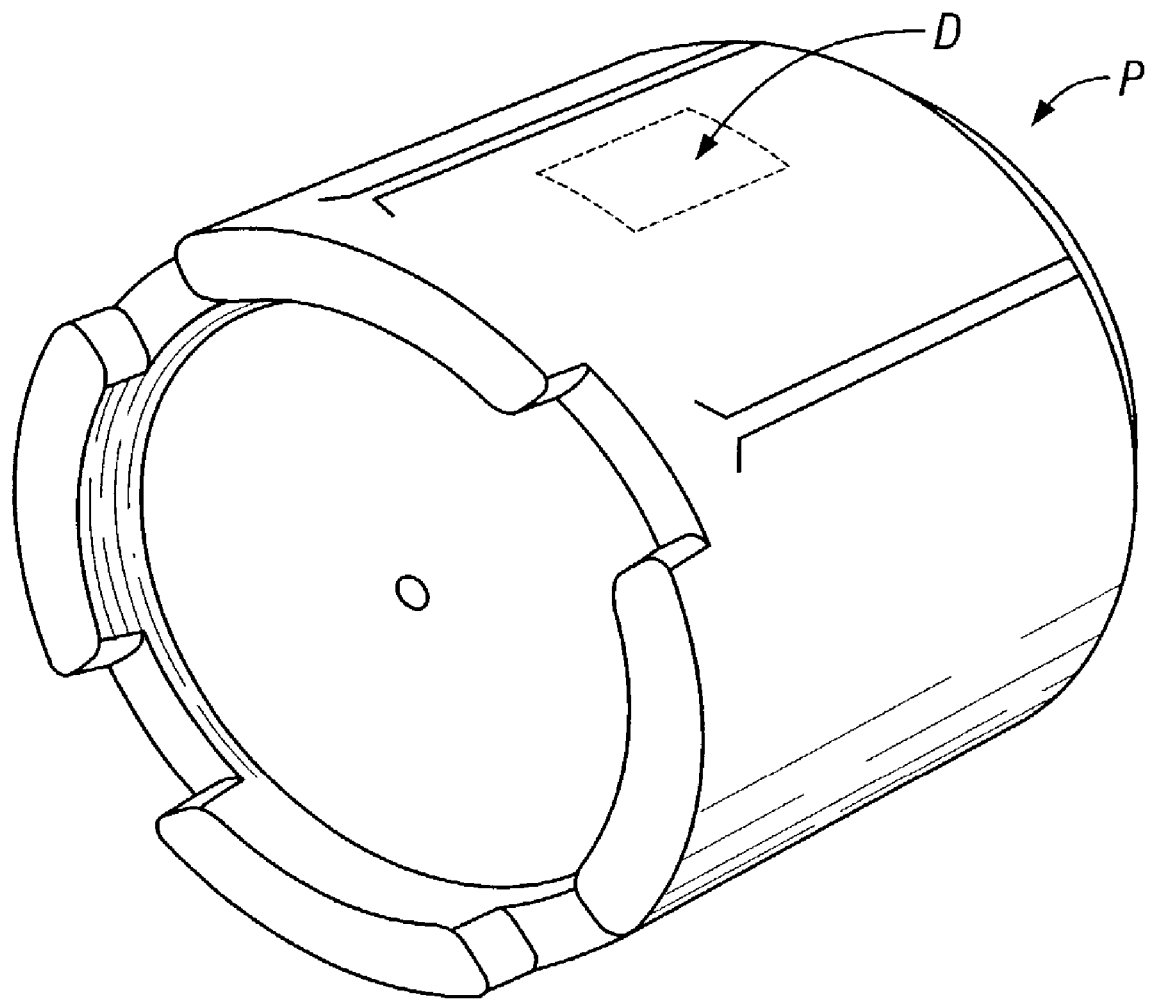
FIG. 1 is an isometric view of one type of an identifier mechanism according to the present invention.

The subject matter of the present invention provides for inspections of completion components and assemblages of well equipment for use in wells, such as oil and gas well or water well operations. The well operations may be drilling or completion or other well operations. The present invention is based on the use of radio identifier devices, such as those radio frequency identifier systems commercially available from Texas Instruments Incorporated or other commercial sources. There are several types of such radio frequency identifiers available, such as those known as Radio Frequency ID devices or RFID's. These devices contain data memory or storage for receipt of information, and respond to the presence of radio frequency energy at a specified wavelength or band by wireless transmission of the stored information over radio waves. According to the present invention, radio identifier devices are individually encoded with information about an item of particular well completion equipment and then mounted or otherwise suitably attached to that equipment. With the present invention, information about the various items is then available and a set of information assembled about the composite group of items for shipment to a well operation at a well site. The integrity of the shipment may be monitored according to the present invention while the shipment is in transit.

It is preferred that the RFID identifier chip is embedded or molded into a device that will travel with a completion component for use in oil and gas well operations, and remain with the component during oil and gas well operations, as well as during inspection and surveillance prior to and during shipment of the component to a well job site. As used in the present invention, well equipment may be drilling equipment, completion equipment or associated well equipment. Completion equipment is defined as any of the various items, pieces or parts that can be included to make up a well completion assembly for a well. Such a well completion assembly is in turn defined as equipment that is capable of being installed or used at the surface, or lowered into an oil or gas well for drilling or completion of a well or for other operations in the well. Well drilling equipment includes any of the various items, pieces or parts used as a part of, or in connection with, the drilling of a well whether at the well head, in the borehole, or elsewhere in connection with the well drilling. Associated well equipment is defined as equipment used in connection with well operations, whether in the well, at the wellhead or in use in some manner associated with the well. The equipment of any of the foregoing types used in a well can be lowered into the well by a number of conventional techniques, such as on a work string, as part of a production tubular string, on a wire line or on a slick line. The component(s) and/or the assembly thus may or may not be threadably en-aged with other equipment.

Thus, with the foregoing definitions in mind, well equipment according to the present invention includes the following example types of equipment:

| | | |
|---|---|---|
| 1. | Well Head Equipment | |
| 2. | Blowout Preventer (BOP) Equipment | |
| 3. | Storage Tanks | |
| 4. | Oil and Gas Production Equipment | |
| 5. | Surface Site Facilities | |
| 6. | Offshore Platform Structures | |
| 7. | Land Well Structures | |
| 8. | Well Completion Assemblies | |
| 9. | Oil and Gas Rig Motors-Engines-Turbines | |
| 10. | Oil and Gas Meters | |
| 11. | Gas Compression Equipment | |
| 12. | Dehydration Equipment | |
| 13. | Process Water Equipment | |
| 14. | Subsea Wellhead Housings | |
| 15. | Subsea Wellheads | |
| 16. | Subsea & Mudline Hanger Running Tools | |
| 17. | Subsea Rental Tools | |
| 18. | Subsea Trees | |
| 19. | Junction Plates/Terminations | |
| 20. | Leads/Jumpers for Umbilicals | |
| 21. | Mudline Hanger Equipment | |
| 22. | Corrosion Caps/Clean Out Tools | |
| 23. | Cameras | |
| 24. | Remotely Operated Vehicle (ROV) Tools | |
| 25. | Safety Valves | |
| 26. | Pup Joints | |
| 27. | Flow Couplings and Flow Pups | |
| 28. | Landing Nipples | |
| 29. | Valves | |
| 30. | Valve Release (VR) Plugs | |
| 31. | Tees | |
| 32. | Tubing Head Adapters | |
| 33. | Tree Adapters | |
| 34. | Slips & Packoffs | |
| 35. | Chokes - Adjustable & Positive | |
| 36. | Double Pin Subs | |
| 37. | In Line Ball Valves, or TIW's | |
| 38. | Inside Blowout Preventers (BOP's) | |
| 39. | Companion Flanges | |
| 40. | Tubing Hangers | |
| 41. | Mud Motors | |
| 42. | Measurement While Drilling (MWD)/ Logging While Drilling (LWD) Tools | |
| 43. | Stabilizers | |
| 44. | Drilling Jars and Bottomhole Assemblies (BHA's) | |

Other types of equipment used on or in connection with well operations and with which the present invention may be used will be apparent to those in the art.

An RFID identification chip or device D for those components which are provided with threaded connectors can be embedded or molded into a thread protector P, as shown in FIG. 1. The thread protector P may be made of a synthetic resin, foam, metal or other material, and serves a primary function to be mounted to protect make-up threads for tubular goods and other oil and gas down hole components. The thread protector P shown in FIG. 1 is one for a pin end of a threaded connector. However, it should be understood that protectors according to the present invention may be either of the type which can be inserted in the box end (female end) of a tubular product or component or of the type shown in FIG. 1 mounted on the pin end (male end) of such a component or tubular good.

The radio frequency identification chip D may be embedded or encapsulated into the foam or synthetic resin body of the thread protector P. By so mounting the RFID chip D in the thread protector, the radio frequency identifier device D is protected from damage while a component is inspected or surveyed. The RFID chip D may also be affixed in other ways to the body of the thread protector P. Also, the RFID chip D allows information about the component to be transmitted and encoded into the memory portion of the RFID chip set associated with a particular component.

Depending on the memory size of the device D, various types of data or information may be received and encoded therein for the purposes of the present invention. Thus, information contained in the REID chip D may contain selected ones or all of the following types of information.

a. Dimensional specifications of a particular component.
b. Material composition of the component.
c. Date of manufacture.
d. Date of assembly.
e. Date of quality inspection survey(s).
f. Quality inspector(s).
g. Manufacturer of component or its material.
h. Machining process for component.
i. Contact personnel associated with manufacturer of component.
j. A unique identifier number that identifies a component and its relation in a series of components.
k. Date that components or assemblage of components were shipped or made ready for a particular oil and gas well completion job.
l. Project codes.
m. Surveillance or inspection work order number.
n. Vendor or completion company code number.
o. Location of the component in a completion string at the job site.

Figure 2:
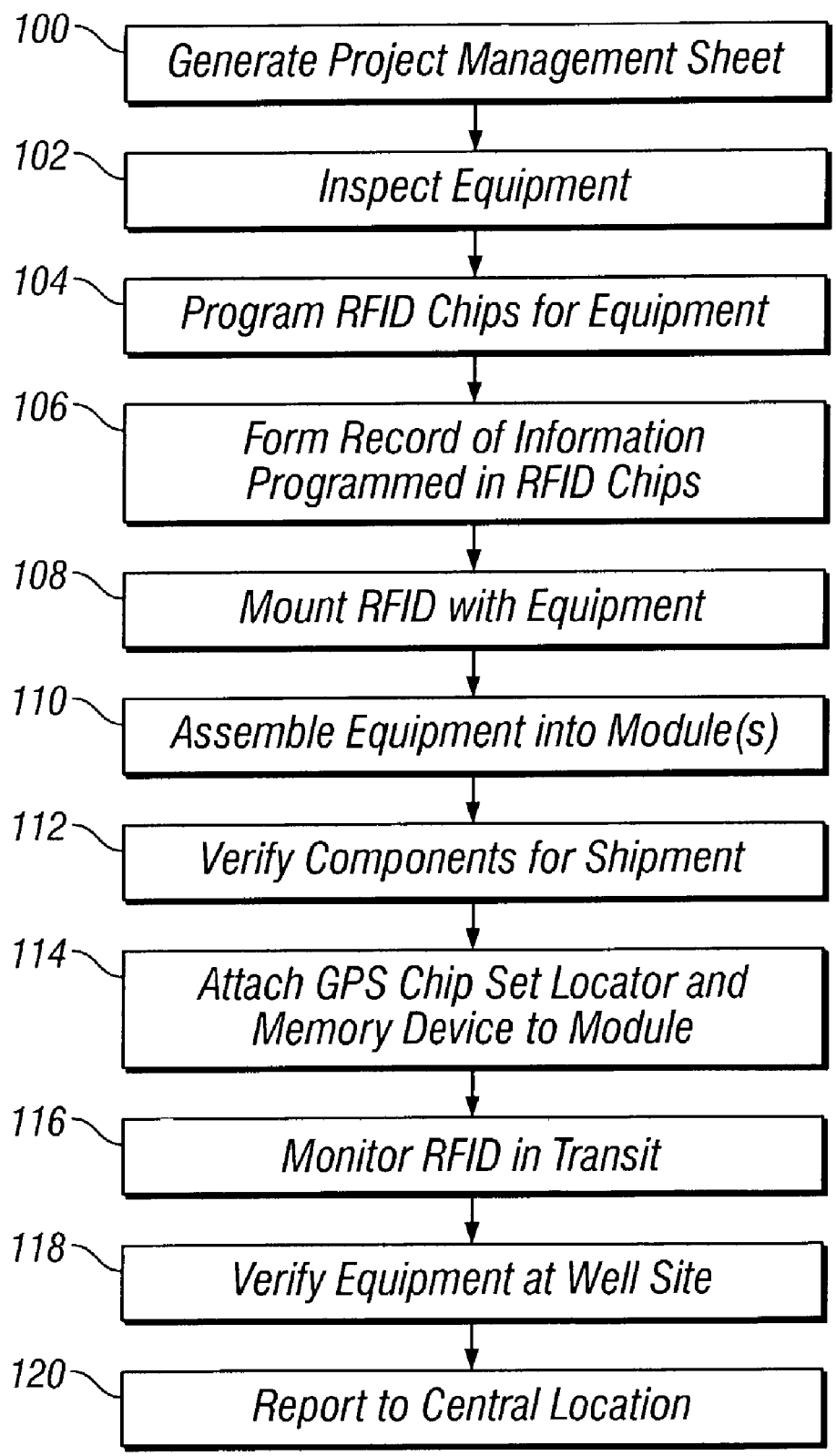
FIG. 2 is a flow chart indicating schematically the process of the present invention.

The process according to the present invention in a preferred embodiment is set forth schematically in FIG. 2. During a first step 100, documentation in the form of project management data, either in document or digital form, indicating the required components for a particular well operation is generated digitally and hard copy. In connection with this portion of the process, other relevant documentation, such as a surveillance work order, is generated. If required, coordination of vendor(s) of the components is made to the extent required to authenticate the information relating to the components.

Figure 3:
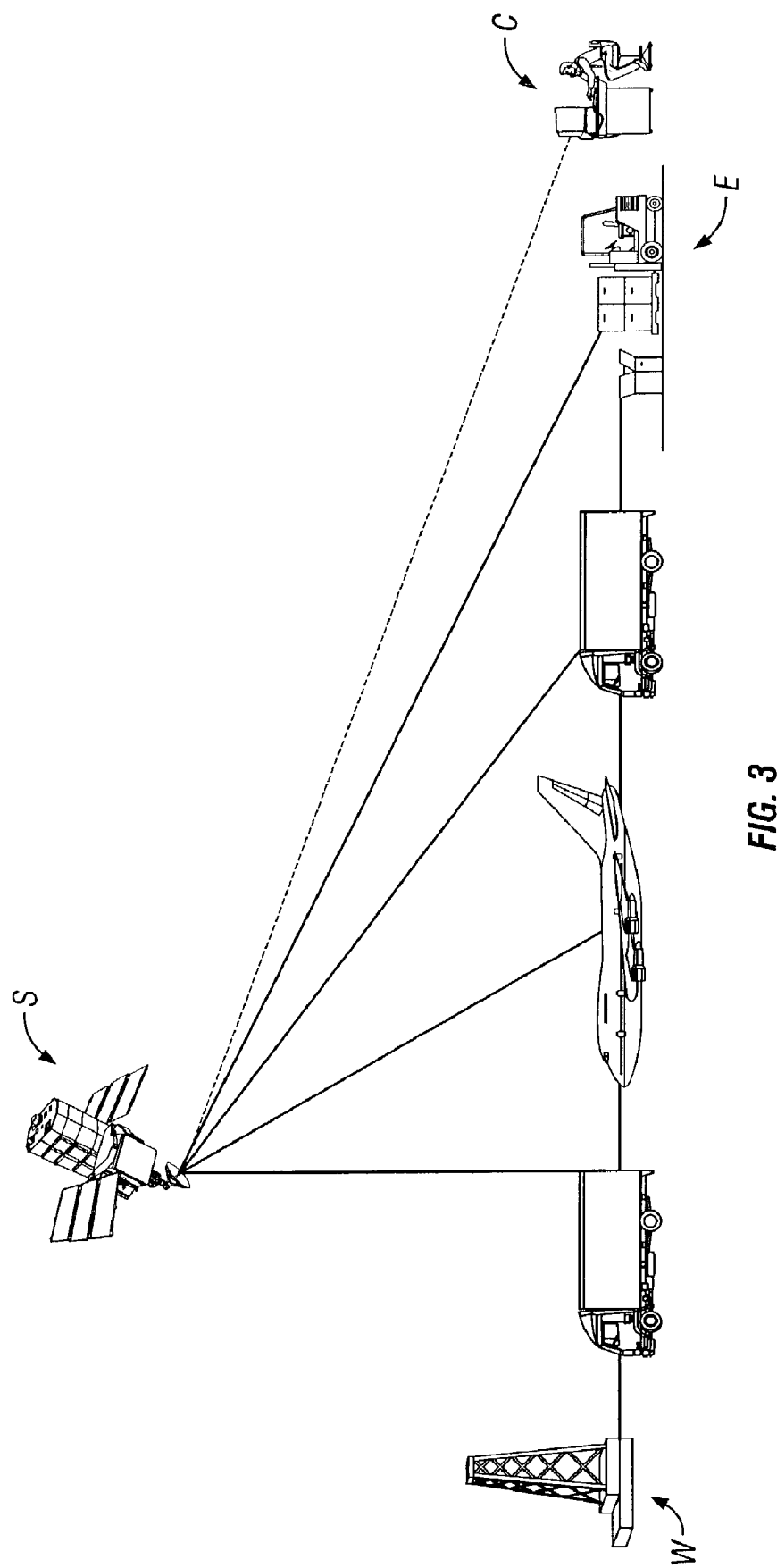
FIG. 3 if a schematic diagram of storage and shipment of well equipment according to the present invention.

Next, as indicated schematically at step 102, an inspector is sent to an equipment plant or yard E (as indicated schematically in FIG. 3), at which location the inspector performs the specified inspection/surveillance of the components or assemblages. During such surveillance and inspection, the inspector accomplishes programming or encoding of an RFID chip set, as indicated at step 104. Programming could also be done at the manufacturer's facility or some other site prior to arrival of the equipment at the plant. The set of RFID chips programmed preferably includes at least one radio identifier device for each component inspected or surveyed. This is performed in the conventional manner of RFID encoding programming with the assistance of an encoding computer or similar device available, for example, from Texas Instruments or other supplier of the RF identifier devices. Each encoded RFID chip of the set is to one then specifically assigned or allocated to one component or assemblage included in the shipment. A unique identifier number or code is programmed or fed into the chip set, as well as those desired portions of information of the type described above.

At this time, the inspector also records, as indicated at step 106, the encoded information in a suitable memory or data storage device, such as a computer or other similar device. This forms and stores a database of information for later retrieval, use and processing concerning the components being assembled for shipment.

The inspector also during step 108 mounts the encoded RFID device with the equipment if the radio frequency identifier has not already been embedded or molded into some item, such as thread protector P, mounted with the component.

Placement of the RFID chip set(s) can be done using a variety of techniques. One method, discussed above, is to embed the RFID chip in a component or assemblage associated with the component. This provides an advantage that the chip could not be easily removed, and would or could be embedded at time of manufacture. However, the chip could not be readily reused if that were desired. If an RFID chip were placed in an item made available repeatedly for use by rental, or an item which is repetitively used, an embedded chip may become damaged or non-usable over time, and a new embedment would have to be made.

Another method of placement is to affix or mount the chip externally in some form or fashion to the component. This may be done in a variety of ways. The chip could be placed on the components or assemblages using a self-adhesive card that contains the chip and its components. An advantage of this is that the chip can be of a disposable type, and thus relatively inexpensive. Upon arrival of the components at their final destination, the self-adhesive card and chip can be taken off and disposed of. An advantage is that a self-adhesive card is easily applied and inexpensive in the overall process of inspecting, tagging, and inventorying a component or assemblage. An RFID chip could also be strapped via a plastic strap and then be available to be reused.

Use of an RFID chip embedded into a thread protector or a foam piece according to the present invention as discussed above is a particularly advantageous way to place the chips with components or assemblages. The chip(s) can be reprogrammed and re-used over and over again. One problem is that the thread protectors are easily taken out of the component(s) and could become misplaced. Where the present invention is practiced wire line tools that may not have a thread engagement, an RFID chip can be affixed to the tool or component using the self-adhesive method or strapping method as outlined above.

Next, during step 110, the components and assemblages for the particular job are placed into a shipping module and prepared for shipment to a particular well site. As an example, such a container could be six or so feet wide and 20 to 40 feet long with an open top, caged sides and a solid sheet steel or expanded metal bottom. All components for shipment are verified during step 112 using an RFID reader via the code numbers assigned to the RFID chip set. Such a RFID reader may be of the type, for example, from Texas Instruments Incorporated. It should be understood that RFID chips from other suppliers might also be used. The RFID chip reader collects the component or assembly information that is contained in the shipping model or vessel and stores it in a shipment database, which corresponds to the data encoded earlier.

As an additional feature, a global positioning or GPS Chip set locator device or sending unit may be placed as indicated in step 114 on or in the shipping module or vessel. The GPS device may be connected to a memory device that stores the shipping data about the components in the shipping vessel or module. Position data is available from the satellite S. This allows real-time monitoring of the components as indicated at step 116 during shipment from the yard E (FIG. 3) to well site W or other location anywhere on the globe. The monitoring may also be done from a central location C or mobile location via a fixed, mobile, or handheld computing device. This permits travel and location of the shipping vessel or module(s) to be tracked as it makes its way by truck, plane, or other transport method to the specific well or job site W. Transit of the module(s) may be tracked, via the Internet or similar means, by use of a fixed or mobile computing device. Once the shipment of components or assemblages arrives at well site location W, the contents can be re-verified, as indicated at step 118, at well site with an RFID reader for accuracy of the contents of shipping vessel or module. The items and materials received can thus be matched with the original data compiled before shipment during the completion inspection process.

It is noted here that the encoded results of process steps above described may be fed real time via spread spectrum or other transmission to a computer at the central control or data processing location C. The transmission of the data may be done over the Internet or other communications media, and may include one or more computing device at the point of assembly or origin of shipping as the control location.

After completing an inventory of the components received at the well site W, the inspector prepares, as indicated at step 120, a surveillance report, which contains an inventory of each device, component, or assemblage recorded as passed or rejected, with a corresponding RFID code number. Based on the surveillance report, appropriate accounting and control procedures to the appropriate offices specified by the particular inventory and reporting methods of the user are then performed.

The foregoing disclosure and description of the invention are illustrative and explanatory thereof, and various changes in the size, shape and materials, and components, as well as in the details of the illustrated construction may be made without departing from the spirit of the invention.

What is claimed is:

1. A method of monitoring shipments of individual well equipment components during transport and storage for a well job for use, comprising the steps of:

combining individual well equipment components and encoding information about the individual well equipment components into reusable radio frequency identifiers associated with a GPS chip set;

attaching the reusable radio frequency identifiers associated with the GPS chip set with encoded information about the individual well equipment components to the respective individual well equipment components;

assembling the individual well equipment components with attached reusable radio frequency identifiers associated with the GPS chip set into at least one module;

encoding information about the at least one module into at least one module radio frequency identifier associated with the GPS chip set;

attaching the at least one module radio frequency identifier to a corresponding module;

monitoring and verifying the location of the at least one module radio frequency identifier with information about the corresponding module during storage and shipment to the well job;

monitoring and verifying the location of each of the reusable radio frequency identifiers associated with the GPS chip set for each of the individual well equipment components assembled into the at least one module using a RFID chip reader in the at least one module during storage and shipment to the well job;

detecting changes to the locations of the individual well equipment components in the at least one module continuously;

producing a surveillance report detailing changes recorded during shipment of the individual well equipment components in the at least one module;

transmitting the surveillance report to a control location;

transmitting results of monitoring the at least one module radio frequency identifier to the control location;

upon completion of the shipment, outputting, at the control location, a record of the results of monitoring and verifying the reusable radio frequency identifiers, the at least one module radio frequency identifier, or combinations thereof; and removing the reusable radio frequency identifiers from each of the individual well equipment components after transport to the well job and reusing the reusable radio frequency identifiers.

2. The method of claim 1, wherein the encoded information for the individual well equipment components includes: dimensional specifications for the individual well equipment components.

3. The method of claim 1, wherein the encoded information for the individual well equipment components includes: material composition of the individual well equipment components.

4. The method of claim 1, wherein the encoded information for the individual well equipment components includes: quality control information for the individual well equipment components.

5. The method of claim 1, wherein the encoded information for the individual well equipment components includes: an identifier number for the individual well equipment components.

6. The method of claim 1, wherein the encoded information for the individual well equipment components includes: a supply source.

7. The method of claim 1, wherein the encoded information for the individual well equipment components includes: shipment information for the individual well equipment components.

8. The method of claim 1, wherein the encoded information for individual well equipment components includes: planned location in the well of the individual well equipment components.

* * * * *